Nov. 24, 1936.  H. S. GINN  2,062,219
ROTARY INTERNAL COMBUSTION ENGINE
Filed Dec. 18, 1934   2 Sheets-Sheet 2
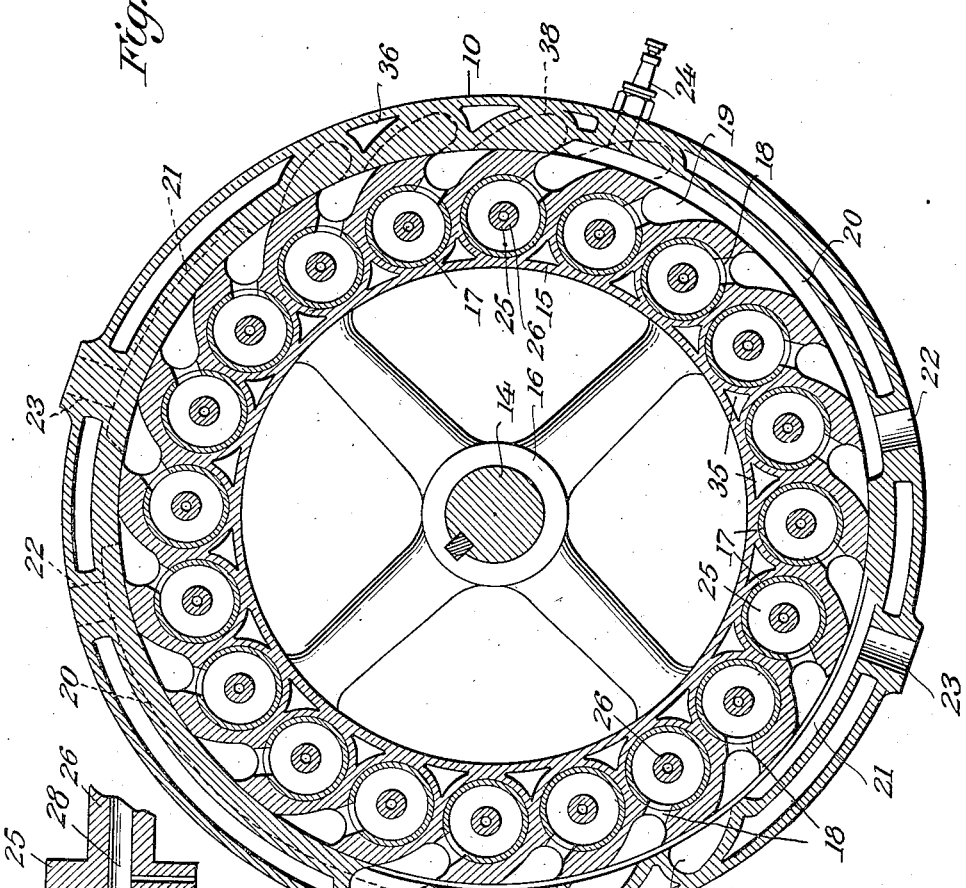

Patented Nov. 24, 1936

2,062,219

UNITED STATES PATENT OFFICE 2,062,219

ROTARY INTERNAL COMBUSTION ENGINE

Horace S. Ginn, Bell, Calif., assignor of one-half to William Kelm, Santa Ana, Calif.

Application December 18, 1934, Serial No. 758,066

2 Claims. (Cl. 123—43)

The invention relates to combustion engines and more especially to rotary internal combustion engines.

The primary object of the invention is the provision of an engine of this character, wherein a series of rotary wheels carry pistons, these being controlled by cams set so as to compress fluid which when ignited drives the wheels, the pistons operating parallel with the axis of rotation of the wheels in the operation of the engine so that a maximum of power is had and a minimum consumption of fuel being required in the working of the engine.

Another object of the invention is the provision of an engine of this character, wherein the power shaft has arranged thereon, at opposite ends of the engine casing, fan wheels for the circulation of air through the engine for cooling purposes, the make-up of the engine being novel in construction and automatic lubrication being had during the working of said engine.

A further object of the invention is the provision of an engine of this character, which is comparatively simple in its make-up, thoroughly reliable and efficient in its working, the parts thereof being readily accessible, strong, durable, and comparatively inexpensive in the manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 2 is a vertical transverse sectional view.

Figure 3 is a fragmentary enlarged sectional view through one of the pistons and the lubricating pump therefor.

Figure 4 is a diagrammatic plan view showing the positions of the pistons within the cylinders during the cycle rotation of the engine.

Similar reference characters indicate corresponding parts throughout the several views in the drawings.

Figure 1:
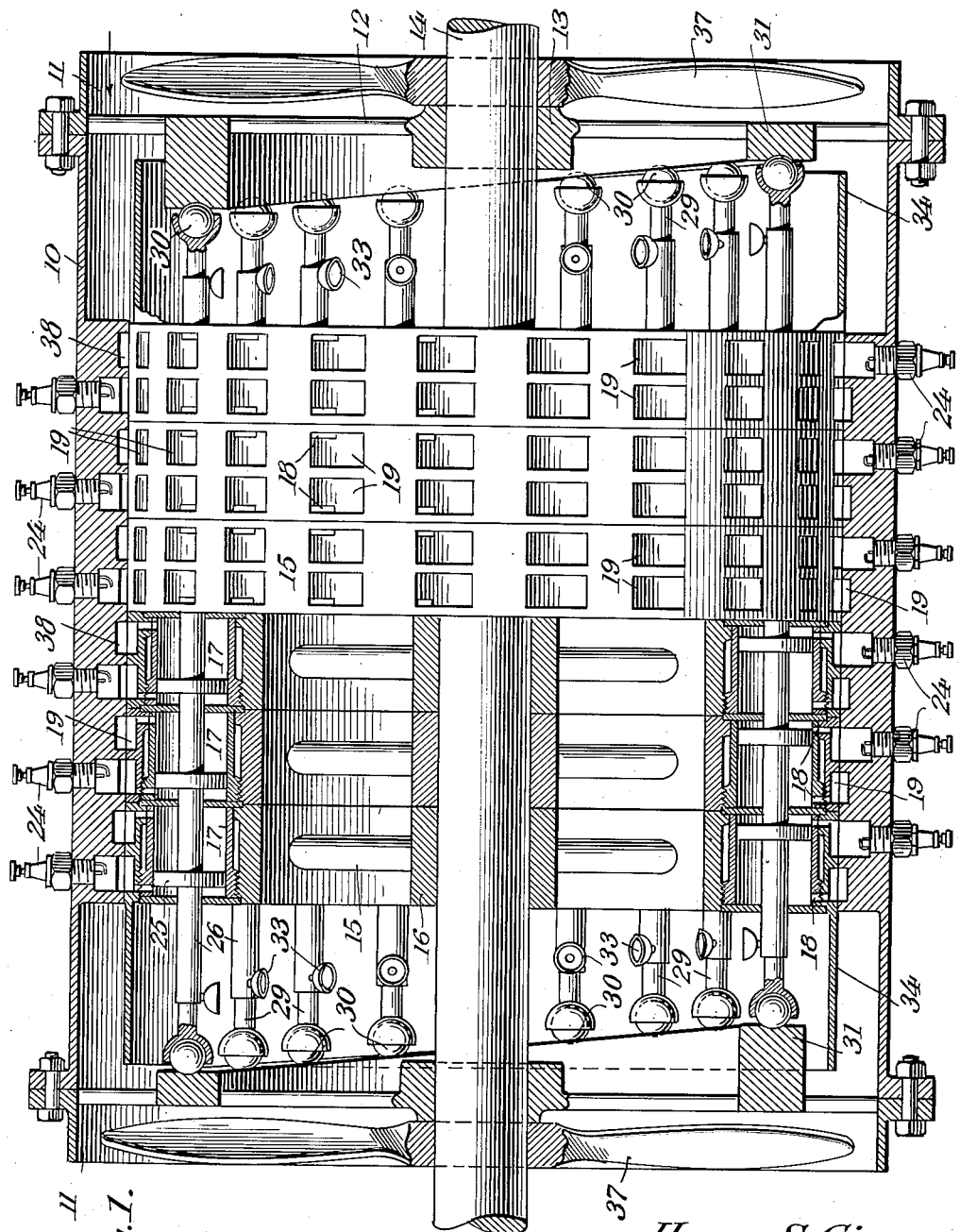
Figure 1 is a vertical longitudinal broken sectional view through the engine.

Referring to the drawings in detail, the engine comprises a cylindrical casing 10 which is stationarily supported in any desirable manner and has opposite open ends 11 which have fitted thereto spiders 12 providing central bearings 13 for a power shaft 14 which is longitudinally disposed through said cylinder. Upon this power shaft 14 is a series of spoked wheels 15, the hubs 16 of which are made fast to the shaft in any desirable manner, so that the wheels in the series rotate as a unit.

Removably fitted within the outer peripheries of these wheels are piston cylinders 17, these being disposed concentrically about the hubs 16 and longitudinally parallel with the power shaft 14. Each cylinder near opposite ends is provided with ports 18 for communication thereof with buckets or pockets 19, these being arranged angularly and curvilinear in spaced rows circumferentially of said wheels 15, and such buckets or pockets 19 are uniformly spaced from each other circumferentially of said wheels so that those of the respective rows will establish communication with intake and exhaust passages 20 and 21, respectively, at diametrically opposite points in the casing 10, these being communicative with the intake and exhaust openings 22 and 23, respectively, which are diametrically opposed in the casing 10. Thus it will be seen that certain of the pockets or buckets 19 of one row at one side of the engine will be communicative with the intake 20, while the remaining pockets or buckets of that row at the other side of the engine will be in communication with the exhaust 21 in the working of the engine.

Fitted at diametrically opposite points in the casing 10 are the spark plugs 24 for the ignition of the compressed fluid within the cylinders 17 of the wheels 15, the ignition being effected in any conventional manner.

Working within the cylinders 17 are pistons 25 having the reciprocating rods 26 which provide at their ends lubricating pump barrels 27 from which lead the lubricant ways 28 through the pistons 25 for lubrication of the walls of the cylinders 17. Fitted within the barrels 27 are the pumping plungers 29 which, at their outer ends, loosely support ball contacts 30 engaging cams 31, these being a part of the spiders 12 at opposite ends of the casing 10, the plungers 29 being tensioned by coiled springs 32 fitted within the barrels 27 so that a positive engagement of the balls 30 will be had with the cams 31 during the working of the engine and especially on displacement of the pistons 25 within the cylinders 17 on ignition of the compressed fluid therein. These plungers 29 working within the barrels 27 effect the feed of lubricant from oil cups 33 which are supplied with oil in any convenient or desirable manner for the lubrication of the pistons 25 and the walls of the cylinders 17 in which the said pistons are working.

The outermost wheels 15 at opposite ends of the casing 10 have annular flanges 34 and the peripheries of these wheels 15 and also the casing 10 being provided with air circulating spaces 35 and 36, respectively, while the power shaft 14 carries bladed fans 37, one acting as an air blower within one end 11 of the casing and the other acting as a suction medium in the other end 11 of said casing, so that under the operation of the engine a circulation of air is maintained longitudinally through the engine, that is, through the wheels 15 and the casing 10, as will be obvious from Figures 1 and 2 of the drawings.

When the engine is started the pistons 25 within the cylinders 17 are reciprocated and on ignition of the compressed fluid within these cylinders the wheels 15 in the series of the unit are driven, the intake of the fluid being had through the intake openings 22 and the exhaust of such spent fluid delivered through the exhaust openings 23 in the casing 10 of the engine. The pistons 25 are reciprocated under the influence of the cams 31 with which contact the balls 30 carried by the plungers 29 fitting the ends of the piston rods 26.

The action of the pistons 25 in the working of the engine during a complete revolution of the power shaft 14 is diagrammatically disclosed in Figure 4 of the drawings.

The casing 10 has the stationary pockets or buckets 38, these being correlated with the movable pockets or buckets 19 in the rotor unit as constituted by the wheels 15 of the engine.

The flanges 34 at opposite ends of the rotor unit divide the air circulating through the engine, as indicated by the arrows in Figure 1 of the drawings, so that air streams will pass through the rotor unit and also through the casing of the engine, the fans 37 acting as pull and push mediums for the air streams, thus cooling the engine in the operation of the same.

It is to be understood that by removing the spark plugs and connecting the spark plugs 24 and connecting their openings with tanks, the structure can be utilized as an air compressor and this is contemplated within the scope of use of the invention.

What is claimed is:

1. In a rotary internal combustion engine, a cylindrical casing provided with opposed pairs of inlet and exhaust chambers, respectively, and opposed series of combustion chambers intermediate said pairs of chambers, said combustion chambers opening into said casing and being oblique to the axis thereof, a rotor in said casing having a circular series of cylinders therein disposed parallel with and concentric to the axis of the rotor, said rotor being ported for communication of said cylinders with said inlet chambers and having bucket shaped openings therein for establishing communication between said cylinders and said exhaust and combustion chambers, respectively, said bucket shaped chambers being disposed obliquely in correspondence with said combustion chambers, pistons in said cylinders, and means for reciprocating said pistons as an incident to rotation of said rotor.

2. In a rotary internal combustion engine, a cylindrical casing provided with opposed pairs of inlet and exhaust chambers, respectively, and opposed series of combustion chambers intermediate said pairs of chambers, said combustion chambers opening into said casing and being oblique to the axis thereof, a shaft journaled in said casing axially thereof, a rotor comprising a plurality of wheel like members fast on said shaft in concentric side by side relation each member comprising a circular series of cylinders parallel with the axis of the member and concentric thereto, the cylinders of the various members being aligned in transverse series and closed at their ends, said members being ported for communication of said cylinders with said inlet chambers, and having bucket shaped openings therein for establishing communication between said cylinders and said series of combustion chambers and the exhaust chambers, respectively, said bucket shaped openings being obliquely disposed in correspondence with the combustion chambers, a plurality of piston rods common to each transverse series of cylinders, respectively, pistons on said rods in each said cylinders, and means for reciprocating said rods.

HORACE S. GINN.